T. B. NICKEL.
SAFETY VALVE.
APPLICATION FILED JAN. 23, 1914.
1,114,796.
Patented Oct. 27, 1914.
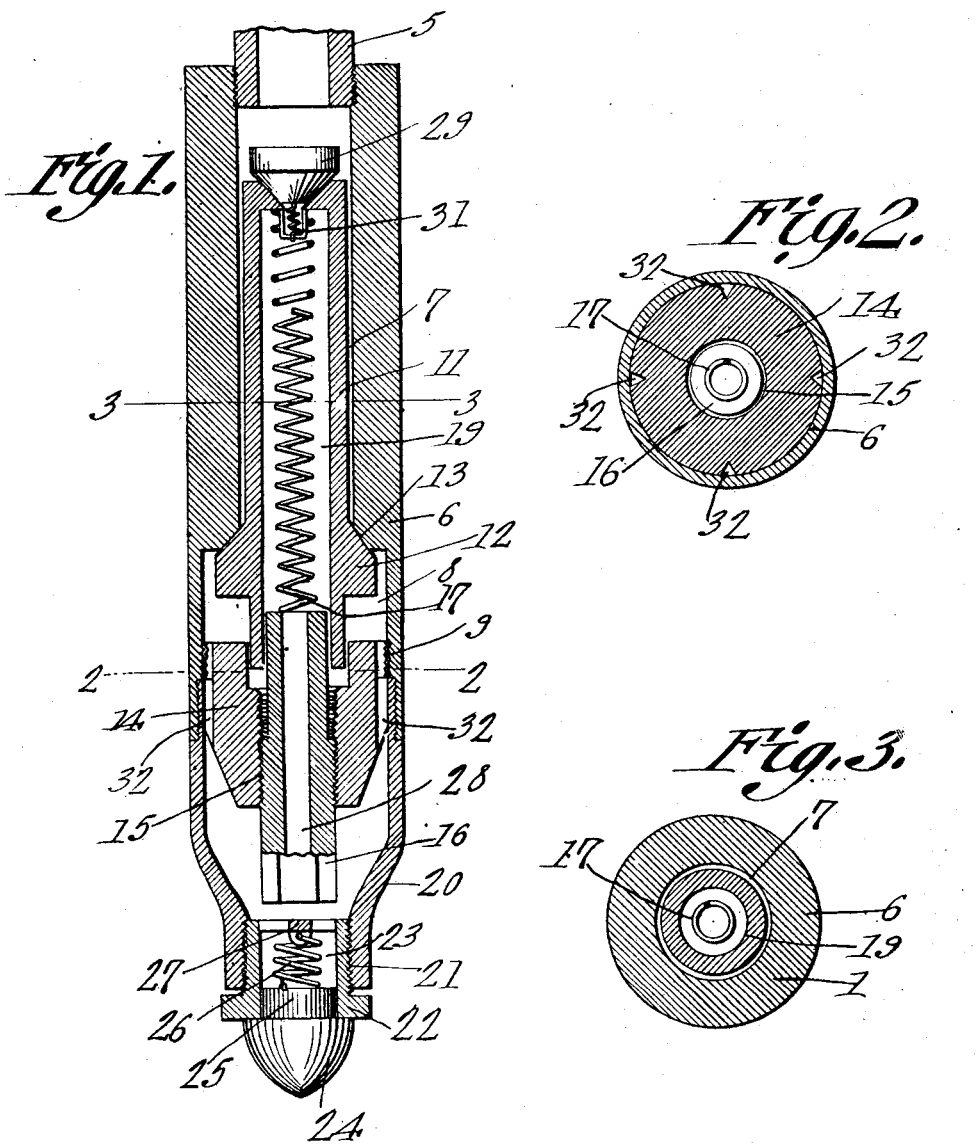
T. B. Nickel,
Inventor
by C. A. Snow & Co.
Attorneys

UNITED STATES PATENT OFFICE.

THOMAS B. NICKEL, OF McCRACKEN, KANSAS.

SAFETY-VALVE.

1,114,796.  Specification of Letters Patent.  Patented Oct. 27, 1914.

Application filed January 23, 1914. Serial No. 813,959.

*To all whom it may concern:*

Be it known that I, THOMAS B. NICKEL, a citizen of the United States, residing at McCracken, in the county of Rush and State of Kansas, have invented a new and useful Safety-Valve, of which the following is a specification.

This invention relates to safety valves and more particularly to a valve to be used in connection with automobile tires wherein the pressure will be relieved if it rises to excessive values and at the same time provides a valve through which the air may be introduced while pumping up the tire.

An object of the present invention is to provide an improved form of safety valve which in addition to providing an escape for excessive pressures of air within automobile tires, also provide an automatic shut-off valve through which air may be introduced for the pumping up of tires.

A further object is to provide an improved safety valve for pneumatic tires in which the pressure at which the valve releases may be adjusted.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable embodiment of my invention is illustrated, in which:—

Figure 1 is a longitudinal sectional view of my improved valve. Fig. 2 is a transverse view thereof taken on the line 2—2 of Fig. 1. Fig. 3 is a similar view taken on the line 3—3 of Fig. 1.

Referring to the drawings in which similar reference numerals designate corresponding parts throughout the several views, 5 is the inlet pipe to a pneumatic tire and to which my improved valve is threadedly secured.

The valve proper includes the main body portion 6 which is provided with the bore 7 extending longitudinally therethrough and which bore is enlarged at one end as at 8. The body portion with the bore extending therethrough therefore defines a casing, which casing is internally threaded as at 9. A valve plunger 11 is slidably disposed within the bore 7 and is provided with the enlarged head 12 which rests upon a ground seat 13 formed in the side wall of the casing. The valve plunger when it contacts with the valve seat closes the bore 7 and prevents the escape of air from the tire 4.

In order to hold the valve head and plunger in a closed and seated condition, the plug 14 is threadedly secured to the adjacent end 9 of the casing and is provided with the bore 15 extending longitudinally therethrough. An adjusting nut 16 threadedly engages the bore 15 and forms an abutment for a compression spring 17, the remote end of which rests upon the extreme end of the valve plunger 11. In order to impart a large degree of resiliency to the spring 17 so that it will when the valve is unseated, open to a large extent, the valve plunger is provided with the bore or opening 19 extending longitudinally therethrough in which the compression spring is secured. The force of holding the valve head upon the valve seat may thus be varied or adjusted by the adjusting nut 16. A top 20 threadedly engages the casing 6 and houses the adjusting nut and plug 14 therein.

The adjacent extremity of the top or cover 20 is internally threaded as at 21 and in which fits the cap 22. The cap is provided with the opening 23 extending therethrough which allows for the escapement of the air when the valve is released. In order to prevent the accumulation of dirt and objectionable material within the cover and various parts of the valve, the head 24 is provided and which carries a shank 25 which fits down within the opening 23. The head is resiliently held in place by the spring member 26 which is secured to the knob 27 of the cap. Thus the head will resiliently close the opening 23 to the entrance of objectionable material therein but will allow for the free passage of air therethrough which is released from the tire.

The adjusting nut 16 is provided with the opening 28 extending therethrough and which communicates with the bore 19 of the valve plunger. The lower extremity of the bore 19 in the valve plunger is resiliently closed by the valve check member 29 which is resiliently held in place by the tension spring 30, the latter being secured to the spider 31 of the valve plunger. Thus when it is desired to pump air into the tire, the cap 22 is removed and the air hose is directly connected to the threaded end 21 of the cover. The air passes down through the bores 28 and 19 and through the check valve 29, provided that the internal or air hose pressure is greater than the internal pressure on the tire.

From the foregoing it will be apparent that air may be introduced to the valve herein disclosed and will, under normal conditions, be prevented from escaping therefrom. However, if the pressure rises to excessive and dangerous values, the pressure upon the valve plunger will be sufficient to overcome the compressive stress of the spring 17 and will raise the valve plunger from its seat and allow for the escapement of air which passes out through the central bore of the plug 14 and also through a number of V-shaped notches 32 which are cut in the side walls thereof. The air escapes to the atmosphere through the bore 23 of the cap.

Having thus described my invention, what is claimed is:—

A valve comprising a casing, a hollow plunger disposed therein and forming a closure for the casing, the plunger being movable in one direction to open the casing, a valve carried by said plunger and movable in an opposite direction to open the plunger, a plug secured in the upper extremity of said casing and provided with a threaded bore extending therethrough, an adjusting nut with a bore extending therethrough threadedly engaging said plug, and a guiding nut extending within the plunger and guiding and constraining the same to rectilinear motion, a compression spring disposed within said plunger, contacting with the bottom wall thereof and with the said adjusting nut, said plug provided with an enlarged bore receiving the upper extremity of the plunger therein and providing an abutment therefor.

In testimony that I claim the foregoing as my own, I have hereto affixed my signature in the presence of two witnesses.

THOMAS B. NICKEL.

Witnesses:
JAS. JOHNSON,
B. F. KRAUSE.